United States Patent [19]
Tada et al.

[11] Patent Number: 5,750,223
[45] Date of Patent: May 12, 1998

[54] POLYAMIDEIMIDE INNER SURFACE-COATED METAL CONTAINER

[75] Inventors: Akira Tada; Toshihiko Hayashi, both of Yokohama, Japan

[73] Assignee: Toyo Seikan Kaisha, Ltd., Tokyo, Japan

[21] Appl. No.: 683,205

[22] Filed: Jul. 18, 1996

[30] Foreign Application Priority Data

Jul. 21, 1995 [JP] Japan .................. 7-185620

[51] Int. Cl.$^6$ .................. B29D 22/00
[52] U.S. Cl. .......... 428/35.8; 206/524.2; 206/524.3
[58] Field of Search .............. 206/524.2, 524.3; 428/35.8

[56] References Cited

FOREIGN PATENT DOCUMENTS 0549361  6/1993  European Pat. Off. ........ B65D 25/14

OTHER PUBLICATIONS

Patent Abstracts of Japan vol. 14, No. 246 (C-722), 25 May 1990 & JP-A-02 067374 (Takeuchi Press Ind Co. Ltd.) *abstract*.
Patent Abstracts of Japan vol. 14, No. 270 (C-727), 12 Jun. 1990 & JP-A-02 080429 (Hitachi Chemical Co., Ltd.) *abstract*.

*Primary Examiner*—Christopher Raimund
*Attorney, Agent, or Firm*—Sughrue, Mion, Zinn, Macpeak & Seas, PLLC

[57] ABSTRACT

An inner surface-coated container and, particularly, an aerosol-container exhibiting intimate adhesiveness to a metallic base material of the container, inertness to the content and excellent resistance against the corrosion. A thermosetting polyamideimide coating material and, particularly, a composition of a carboxyl group-containing polyamideimide resin and a curing agent consisting chiefly of an epoxy resin, is applied to the inner surface of a metallic aerosol container, and the imide group/amide group absorbancy ratio R is set to be not smaller than 2.5.

9 Claims, 3 Drawing Sheets

POLYAMIDEIMIDE INNER SURFACE-COATED METAL CONTAINER

BACKGROUND OF THE INVENTION 1. (Field of the Invention)

The present invention relates to a container having excellent resistance against the content. More specifically, the invention relates to an inner-coated metal container and, particularly, to an aerosol container which exhibits intimate adhesiveness to a metallic base material of the container, inertness to the content and excellent resistance against the corrosion.

2. (Prior Art)

The inner surface-coated metal containers have been used in a variety of fields on account of their capability of containing various contents maintaining sealing property but still have room for improvements in regard to resistance of the inner surface coating against the content, and study has been forwarded concerning this point.

For instance, an aerosol is contained in a pressure-resistant container having a valve in a form that an object material (mother liquor) and a propellant (injection agent) are contained together or separately. Though various kinds of containers have been known, a metal container is excellent with respect to resistance against the pressure and sealing property.

However, a metal aerosol container has a problem with regard to resistance against the content and resistance against the corrosion. Problem arouses such as underlayer corrosion of coating, blister, etc. particularly when the container contains injection agent and solvent having large permeating property such as dimethyl ether or the like or contains strongly corrosive components.

An epoxy-phenol resin coating material has heretofore been used as- the inner surface coating for the aerosol containers, which, however, still lacks resistance against the content and resistance against the corrosion when strongly permeating and strongly corrosive liquids are contained, and it has been urged to provide a coating material that substitutes for the above coating material.

Japanese Laid-Open Patent Publication No. 67374/1990 discloses an aerosol container obtained by coating the inner surface of a metal container for forming an aerosol can with a polyamideimide resin coating material.

It has been said that the polyamideimide resin withstands against a strongly corrosive liquid such as a cationic surfactant-dimethyl ether-ethanol-water which is a strongly corrosive mixture for a week at 60° C. In many cases, however, the polyamideimide resin develops blister during the subsequent two to three weeks, and is not still satisfactory with respect to resistance against the content.

In recent years, it has been demanded to fill the inner surface-coated metal container and, particularly, the aerosol container with a content that has a property to strikingly deteriorate the inner surface coating or the metal, such as a hair dye. The hair dye is used to dye the hair within very short periods of time, and permeates into the inner coating to a conspicuous degree and, besides, dyes the inner coating itself. Moreover, with the dye being adsorbed by the coating, the content loses the balance of color making it difficult to dye the hair in a desired color. Furthermore, hydrogen evolves as the content comes into contact with the metal underlayer, and the dye is reduced with hydrogen causing the content to be discolored.

SUMMARY OF THE INVENTION

As far as the present inventors know, there has not yet been proposed any inner surface-coated metal container that exhibits sufficient degree of resistance against the content such as hair eye and the like chemicals. Similarly, an inner surface-coated metal container that exhibits high degree of property for not adsorbing pigments is also desired not only in packaging a variety of chemicals but also in packaging the contents such as foods, etc.

The present inventors have discovered the fact that the resistance of the cured polyamideimide coating against the content and, particularly, the property for not adsorbing pigments, is greatly affected by a concentration ratio of the amide groups to the imide groups in the coating material.

The object of the present invention therefore is to provide an inner surface-coated metal container and, particularly, an aerosol container that exhibits intimate adhesiveness to a metallic base material of the container, inertness to the content and excellent resistance against the corrosion.

According to the present invention, there is provided an inner surface-coated metal container made of a metal having a cured polyamideimide coating and exhibiting excellent resistance against the content, wherein said coating has an absorbency ratio as defined by the following formula (I), $$R = I_{1720}/I_{1650} \tag{I}$$

wherein $I_{1720}$ denotes an absorbency of infrared characteristic absorption of an imide group at a wave number of about 1720 cm$^{-1}$, and $I_{1650}$ denotes an absorbancy of infrared characteristic absorption of an amide group at a wave number of about 1650 cm$^{-1}$, of not smaller than 2.5 and, particularly, not smaller than 3.0.

It is desired that the cured polyamideimide coating material is formed of a composition of a polyamideimide resin and a curing agent consisting chiefly of an epoxy resin, and that this composition contains the polyamideimide resin and the curing agent consisting chiefly of the epoxy resin at a weight ratio of from 60:40 to 95:5.

It is further desired that the epoxy resin used for the composition is a bisphenol-type epoxy resin having an epoxy equivalent of from 180 to 3300 and a number average molecular weight of from 360 to 4000, and that the polyamideimide resin that is used is the one derived from at least trifunctional or higher-functional aromatic polycarboxylic acid or an anhydride thereof and an aromatic compound having a bifunctional amino group or isocyanate group.

The present invention is based on the fact that the resistance against the content and, particularly, the property of not adsorbing pigments of the cured polyamideimide coating are greatly affected by the concentration ratio of the amide group to the imide group in the coating material.

That is, the inner surface-coated metal container of the present invention is made of a metal having a cured polyamideimide coating, wherein the cured coating exhibits an absorbancy as defined by the above-mentioned formula (I) of not smaller than 2.5 and, particularly, not smaller than 3.0.

Figure 1:
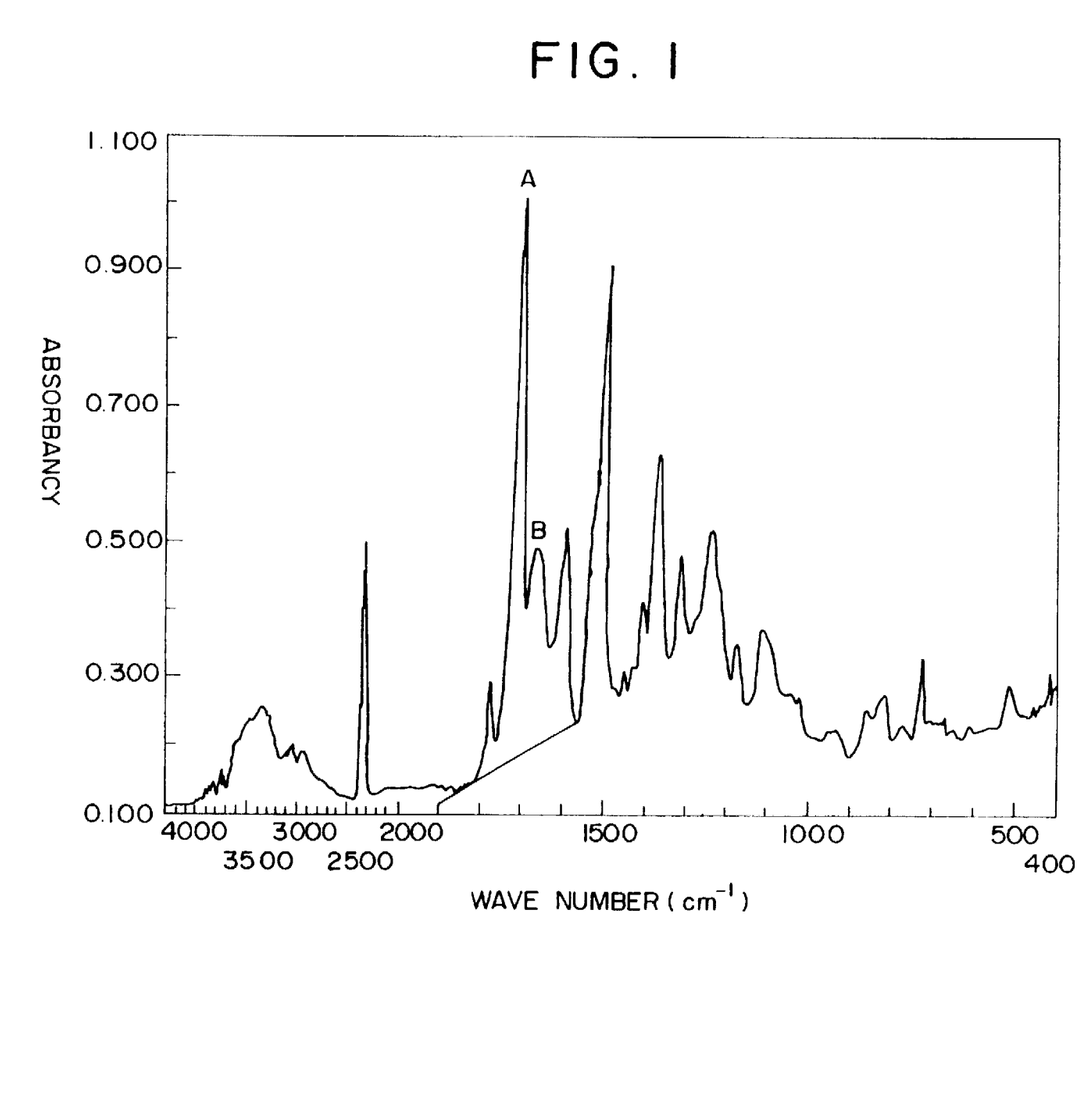
FIG. 1 is a diagram illustrating an infrared absorption spectrum of a cured polyamideimide coating and absorbancy found therefrom.

Referring to FIG. 1 illustrating an infrared absorption spectrum of the cured polyamideimide coating and absorbancy found therefrom, symbol A denotes an infrared characteristic absorption peak of the imide group at a wave number of about 1720 cm$^{-1}$ and B denotes an infrared characteristic absorption peak of the amide group at a wave number of about 1650 cm$^{-1}$. In this infrared absorption spectrum, a base line is drawn between a valley at a wave number of about 1550 cm$^{-1}$ and a valley at a wave number of about 1850 cm$^{-1}$, heights of peaks A and B ($I_{1720}$ and $I_{1650}$) are found from the base line, and an absorbancy ratio R is found from the ratio of these peaks.

In the inner surface-coated metal container having the cured polyamideimide coating, the absorbancy ratio R which is not smaller than 2.5 has a very critical meaning from the standpoint of resistance against the content. This fact will be easily understood from Examples appearing later.

That is, when the polyamideimide resin alone is used as a coating material, it is difficult to increase the absorbancy ratio R of the coating to be not smaller than 2.5. When a hair dye is contained, the coating is dyed to a conspicuous degree and, besides, microcracks and pinholes develop in the coating or the coating is floated at the worked portions of the cans and mounting cups. When the polyamideimide resin and the epoxy resin are used in combination, the coating is dyed or defects occur in the coating when the absorbency ratio R is not larger than 2.5.

On the other hand, when the polyamideimide coating is cured so that the absorbancy ratio R becomes not smaller than 2.5 and, particularly, not smaller than 3.0 in accordance with the present invention, the coating is not almost dyed even when the hair dye is contained, microcracks and pinholes do not develop in the coating and the coating does not float at the worked portions of the cans and mounting cups. Thus, the coating is maintained in a perfect state. From the standpoint of workability of the coating, it is desired that the absorbancy ratio R is not larger than 20 and, particularly, not larger than 10.

The polyamideimide coating contains an imide group and an amide group in the main chain thereof as represented by a recurring unit of the chemical formulas (1) to (4) appearing later. It had been believed that the presence of the imide groups and the amide groups at a predetermined ratio provides the coating with excellent resistance against corrosion and workability in combination. The concentration ratio of the amide groups to the imide groups in a conventional polyamideimide corresponds to an absorbancy ratio R of about 1.2.

However, the resin coating having the imide group/amide group ratio of the above-mentioned degree is not satisfactory for preventing the infiltration of a strongly permeable content such as hair dye or the like, and the concentration of the amide groups must be lowered down to a range- specified by the present invention.

To lower the amide group concentration in the polyamideimide resin, the amide group may be turned into the imide group by closing its ring. In a resin containing free carboxyl groups at a small concentration, however, the epoxy resin may be made present to cure the polyamideimide resin to a high degree. It has been found through experiment that the concentration of amide groups in the cured resin decreases upon the reaction of the epoxy resin with the polyamideimide resin. Though the reaction mechanism has not been clearly known yet, it is presumed that the reaction of inserting the epoxy group into the amide group is taking a part (see THERMOSETTING RESIN, Vol. 6, No. 1, 1985).

According to the present invention as described above, it is desired that the polyamideimide coating is formed of a composition of a polyamideimide resin and a curing agent which chiefly consists of an epoxy resin, the polyamideimide resin and the epoxy resin being used at a weight ratio of from 60:40 to 95:5. That is, either when the amount of the epoxy resin is larger than or smaller than the above-mentioned range, it becomes difficult to bring the absorbancy ratio R to lie within a range of the present invention, resulting in a decrease in the resistance against the content and in the resistance against the corrosion.

It is desired that the epoxy resin used in the present invention is a bisphenol-type epoxy resin having an epoxy equivalent of from 180 to 3300 and a number average molecular weight of from 360 to 4000, and that the polyamideimide resin is the one derived from at least trifunctional or higher-functional aromatic polycarboxylic acid or an anhydride thereof and an aromatic compound having a bifunctional amino group or isocyanate group. These resin components give desired resistance against the content and desired resistance against the corrosion in combination, and further exhibit excellent adhesiveness to the metallic base material and workability.

DESCRIPTION OF THE EMBODIMENT

Figure 2:
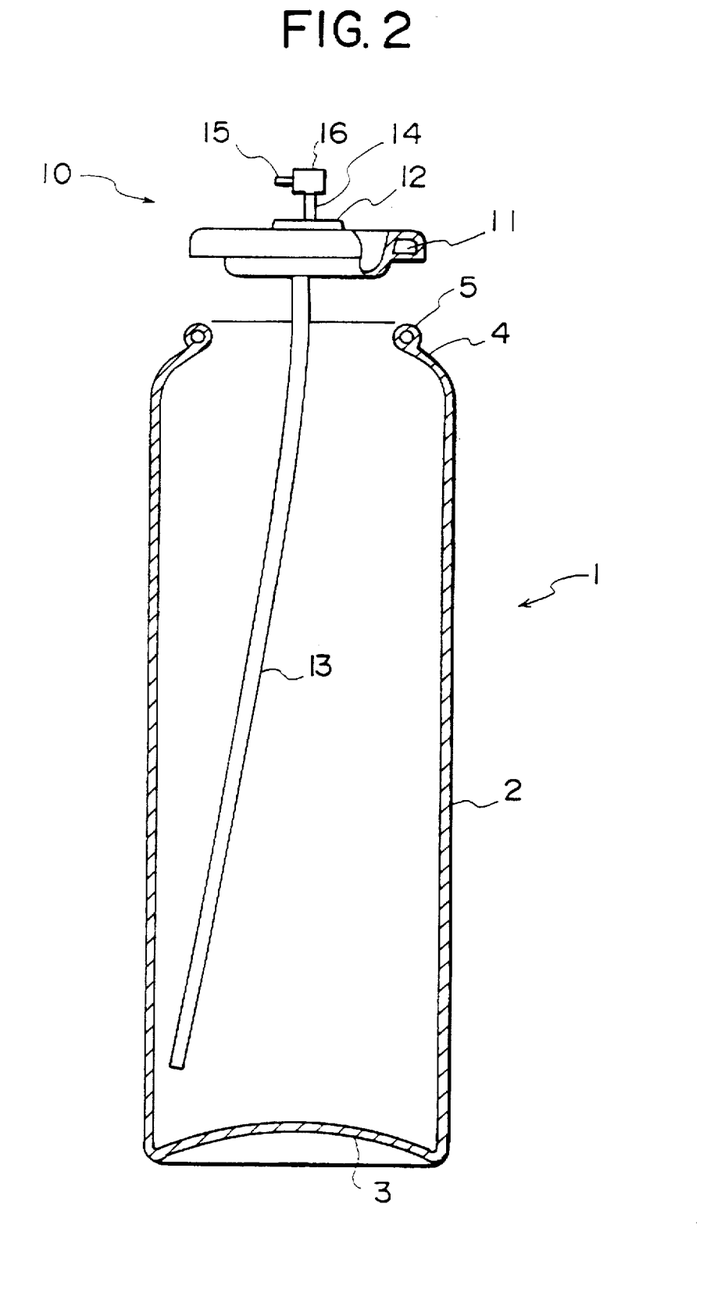
FIG. 2 is a sectional view schematically illustrating the structure of an aerosol container according to an embodiment of the present invention.

Referring to FIG. 2 which schematically illustrates the structure of an inner surface-coated metal container according to an embodiment of the present invention, the container 1 is a can barrel for an aerosol container and comprises a monoblock can of aluminum, i.e., a seamless can in which a barrel 2 and a bottom 3 are seemlessly connected together. The bottom 3 has an upwardly protruded domed shape, the upper portion of the barrel 2 is drawn to have a small diameter thereby to form a neck portion 4, and has a bead portion 5 formed at the mouth thereof. The monoblock can 1 is formed by, for example, impact-forming of aluminum, draw-redraw forming of aluminum or draw-ironing of aluminum.

Onto the monoblock can 1 of aluminum is fastened a valve-holding mounting cup which is generally designated at 10.

The valve-holding mounting cup 10 has the shape of a downwardly protruded cup and has a groove 11 formed along the circumference thereof to engage with the bead 5 of the can and further has a known valve 12 held at a central portion thereof. A flexible dip tube 13 extends from the introduction side of the valve 12 to nearly reach the bottom of the aerosol container. A pipe (stem) 14 located on the discharge side of the valve 12 is provided to move up and down penetrating through the mounting cup 10. An actuator 16 having a blow port 15 is provided at the end of the pipe 14. The groove 11 of the mounting cup 10 is provided with a sealing liner. The bead 5 of the can 1 is fitted into the groove 11 and is clinched to accomplish the sealing.

Figure 3:
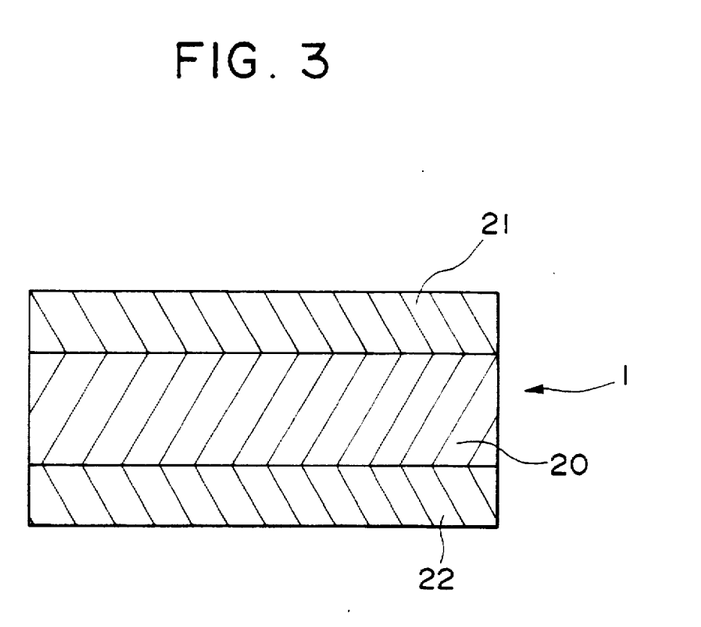
FIG. 3 is a sectional view illustrating, on an enlarged scale, the side wall of the can barrel of the aerosol container of FIG. 2.

Referring to FIG. 3 which illustrates in cross section the structure of the can 1, the can 1 comprises a metallic base material 20, an inner surface protection coating 21 formed on the inner surface thereof, and an outer surface protection coated/printed layer 22 formed on the outer surface thereof. The mounting cup 10, too, has the same structure in cross section.

According to the present invention, the inner surface protection coating 21 comprises a cured polyamideimide coating which has an absorbancy ratio R as represented by the above-mentioned formula (I) of not smaller than 2.5 and, particularly, not smaller than 3.0. It is desired that the absorbency ratio R is not larger than 20 and, particularly, not larger than 10.

The cured polyamideimide coating is formed by applying a composition of a polyamideimide resin or, particularly, a carboxyl group-containing polyamideimide resin and a curing agent consisting chiefly of an epoxy resin onto a metallic base material followed by curing at a predetermined temperature.

As the polyamideimide resin for forming the inner coating, there is used a high molecular polymer having an amide recurring unit and an imide recurring unit in the polymer chain. The amide recurring unit (A) and the imide recurring unit (B) may be coupled together regularly as represented by —A—B—, may be coupled together in a random fashion as represented by —AA—B, may be coupled together in blocks as represented by —AA—BB—, or may be coupled together in a combination thereof.

Many polyamideimide resins have been known, and there can be used, for example, a polyamideimide having a recurring unit represented by the chemical formula (1), (2), (3) or (4).

wherein $R_1$ is a hydrogen atom or a monovalent hydrocarbon group, $R_2$ is a divalent group selected from the group consisting of an aromatic group, an aliphatic group, an alicyclic group, a combination of an aromatic group and an aliphatic group, and substituents thereof, $R_3$ is a trivalent group selected from the group consisting of an aromatic group, aliphatic group, an alicyclic group, a combination of an aromatic group and an aliphatic group, and substituents thereof, $R_4$ is a tetravalent group selected from the group consisting of an aromatic group, an aliphatic group, an alicyclic group, a combination of an aromatic group and an aliphatic group, and substitutes thereof, p is a number of zero or 1, and x and y are numbers that exist at any ratio.

The polyamideimide resin has carboxyl groups as well as amino groups in the molecular chain thereof or at the terminals of the molecular chain. These functional groups impart thermosetting property to the polyamideimide coating material. It is desired that the carboxyl groups are contained at a concentration of from 5 to 50 mmols per 100 g of the polyamideimide resin from the standpoint of imparting resistance against the content.

The polyamideimide resin is derived from at least trifunctional or higher-functional aromatic polycarboxylic acid or an anhydride thereof and an aromatic compound having a bifunctional amino group or isocyanate group.

Examples of the polycarboxylic acid or an anhydride thereof include trimellitic acid or an anhydride thereof, pyromellitic acid or an anhydride thereof, naphthylenetricarboxylic acid, naphthylenetetracarboxylic acid, etc. Examples of the aromatic compound having an amino group or an isocyanate group include 4,4'-diaminodiphenyl, 2,2-bis(4-aminophenyl)propane, 2,2-bis(4-aminophenyl)butane, 1,1-bis(4-aminophenyl)ethane, bis(4-, 3- or 2-aminophenyl) methane, 4-aminophenyl ether, naphthylenediamine, tolylene diisocyanate, 4,4'-diphenylmethane diisocyanate, xylene diisocyanate, naphthylene diisocyanate, paraphenylene diisocyanate, tetramethylxylene diisocyanate, hexamethylene diisocyanate, dicyclohexylmethane diisocyanate, isophorone diisocyanate, toluidine diisocyanate, etc.

Among the above-mentioned polyamideimides, the one having a structure of the chemical formula (3) and, particularly, the polyamideimide in which the trivalent group R3 is a benzene ring is particularly desired for accomplishing the object of the present invention. As the polycarboxylic acid or an anhydride thereof for synthesizing the polyamideimide resin, there may be used a trimellitic acid or an anhydride thereof alone, or a pyromellitic acid and an anhydride thereof in combination. In the latter case, the ratio of trimellitic acid/pyromellitic acid should be from 50/50 to 90/10 on the weight basis.

The polyamideimide resin and the coating material thereof can be synthesized by any known means. The polyamideimide resin in the coating material must have a polyamide chain but may contain imide groups in any amount. For instance, the polyamide acid is synthesized from the above-mentioned two starting materials in an aqueous organic medium such as water/ethanol, and the polyamide acid is dissolved in an organic solvent such as N-methyl pyrrolidone and is used as a coating material. In this case, the imide ring is formed at the time of firing the coating material. Furthermore, the polyamideimide is synthesized in an organic solvent such as N-methyl pyrrolidone and is used as a coating material. In this case, the imide ring has been partly formed, and is completely formed during, the firing of the coating material.

To the polyamideimide resin used in the present invention can be added a widely known catalyst in order to promote the cyclization of the resin during the firing. As such a catalyst, there can be used amines such as trimethylamine or pyridine, or an acid anhydride such as acetic anhydride.

According to the present invention, the curing agent for the polyamideimide comprises chiefly an epoxy resin. It is, of course, allowable to use the epoxy resin alone or to use the epoxy resin in combination with other thermosetting resin. Though there is no particular limitation, the other thermosetting resin is, preferably, a thermosetting resin containing a methylol group and, particularly, a phenolic resin or an amino resin.

As the epoxy resin, there can be preferably used a bisphenol-type epoxy resin obtained by the polycondensation of bisphenols such as bisphenol A with epichlorohydrin. It is desired to use a bisphenol-type epoxy resin having an epoxy equivalent of from 180 to 3300 and, particularly, from 180 to 2400 and a number average molecular weight of from 360 to 4000 and, particularly, from 360 to 3000.

As a phenolic resin used as a sub-component for the thermosetting resin, there is used a resol-type phenol-formaldehyde resin and, particularly, a phenolaldehyde resin component derived from monocyclic phenols and polycyclic polyhydric phenols. Preferred examples of the dihydric phenol include 2,2'-bis(4-hydroxyphenyl)propane(bisphenol A), 2,2'-bis(4-hydroxyphenyl)butane(bisphenol B), 1,1'-bis (4-hydroxyphenyl)ethane, bis(4-, 3- or 2-hydroxyphenyl) methane(bisphenol F), 4-hydroxyphenyl ether, and p-(4-hydroxy)phenol. Examples of the monohydric phenyl include o-cresol, p-cresol, p-tertbutylphenol, p-ethylphenol, 2,3-xylenol, and 2,5-xylenol. It is also allowable to use phenol (carbolic acid), m-cresol, m-ethylphenol, 3,5-xylenol, m-methoxyphenol, 2,4-xylenol, 2,6-xylenol, p-tertamylphenol, p-nonylphenol, p-phenylphenol and p-cyclohexylphenol for the preparation of a phenolaldehyde resin.

The resol-type phenol-aldehyde resin used in the present invention is obtained by reacting the above-mentioned phenol with an aldehyde in the presence of a basic catalyst and, as required, etherifying the methylol group that is formed with butanol or the like. There is no particular limitation on the amount of using the aldehyde with respect to the phenol. That is, the aldehyde can be used in an amount that has heretofore been employed for the production of resol-type resins, and can be, preferably, used in an amount of not smaller than one mol and, particularly, from 1.5 to 3.0 mols per mol of the phenols. There is no particular inconvenience even when the aldehyde is used in an amount smaller than a mol.

As the amino resin used as a sub-component for the thermosetting resin, there can be exemplified urea resin, melamine resin or benzoguanamine resin. The methylol group in the resin may be in a free form or may be etherified with butanol or the like.

It is important that the curing agent contains the epoxy resin in an amount of not smaller than 60% by weight and, particularly, not smaller than 80% by weight from the standpoint of accomplishing adhesiveness of coating, resistance against the corrosion and workability of the formed coating. The curing property is improved when a phenolic resin or an amino resin is used as a sub-component in an amount of not smaller than 5% by weight.

The coating material used in the present invention is obtained by mixing a solution of the polyamideimide resin and a solution of a curing agent consisting chiefly of the epoxy resin. It is desired that the polyamideimide resin and the curing agent consisting chiefly of the epoxy resin are used at a weight ratio of from 60:40 to 90:10 and, particularly, from 70:30 to 90:10.

As the organic solvent, there can be used N,N-dimethylamides such as dimethylformamide, dimethylacetamide, etc.; cyclic ethers such as tetrahydrofurane, dioxane, etc.; dimethyl sulfoxide; aromatic hydrocarbon solvents such as toluene, xylene, ethylbenzene, etc.; ketones such as methyl ethyl ketone, etc.; N-methyl-2-pyrrolidone; and phenols such as phenol, cresol, etc. In the present invention, however, it is particularly advantageous to use a solvent that is usually used for the coating material for producing cans, such as N-methyl-2-pyrrolidone, xylene, methyl ethyl ketone, cyclohexane, etc.

The coating material may be blended with a widely known blending agent for coating materials, such as reforming resin, lubricating agent, leveling agent, viscosity-imparting agent, viscosity-decreasing agent, stabilizer, antioxidizing agent, catalyst for curing and crosslinking agent. As the lubricating agent, for example, use is made of a fat-type lubricating agent, or a variety of natural or synthetic waxes.

By being blended with the above-mentioned phenolic resin, the coating exhibits improved curing property and increased adhesiveness to the base material. By being blended with an urethane-type elastomer and, particularly, with an elastomer derived from the aromatic isocyanate and polyol, furthermore, the coating is imparted with flexibility. Moreover, by being blended with an amino resin, a butylal resin and a xylene resin, the coating is imparted with flexibility.

As the leveling agent, there can be used a high molecular polyester, a fluorine-contained leveling agent or a silicone-type leveling agent. As the catalyst for curing, furthermore, there can be added any known amine-type catalyst or acid anhydride-type catalyst.

It is desired that the coating material has a solid component concentration of generally from 20 to 40% by weight and, particularly, from 25 to 35% by weight, and a viscosity of from 20 to 70 seconds (Ford cup #4, at 25° C.) from the standpoint of coating property.

The coating material of the present invention can be applied to the can barrels and to the closures made of a metal. As a metallic base material, there can be used various metal plates and, particularly, light metal plates such as of aluminum or the like and various surface-treated steel plates.

As the light metal plate, there can be used a so-called aluminum plate as well as an aluminum alloy plate. The aluminum alloy plate having excellent resistance against the corrosion and workability has a composition containing 0.2 to 1.5% by weight of manganese, 0.8 to 5% by weight of magnesium, 0.25 to 0.3% by weight of zinc, and 0.16 to 0.26% by weight of copper, the remainder being aluminum. It is desired that even the light metal plate is treated with chromic acid or chromic acid/phosphoric acid such that the amount of chromium is from 20 to 300 mg/m$^2$ reckoned as metal chromium. The light metal plate may further be treated with titanium/phosphoric acid. In the case of a monoblock can of aluminum, it is desired to effect the dewaxing and surface treatment such as treatment with zirconium/phosphoric acid after the can has been formed.

As the surface-treated steel plate, there can be used a cold-rolled steel plate which is subjected to the secondary cold rolling after the annealing, and is subjected to one or two or more kinds of surface treatments such as zinc plating, tin plating, nickel plating, chromium plating, electrolytic chromate treatment and chromate treatment. A preferred surface-treated steel plate is an electrolytic chromate-treated steel plate having a metal chromium layer of from 10 to 200 mg/m$^2$ and a chromium oxide layer of from 1 to 50 mg/m$^2$ (reckoned as metal chromium). This surface-treated steel plate exhibits excellent adhesiveness to the coating and resistance against the corrosion in combination. Another example of the surface-treated steel plate is a tin plate which is plated with tin in an amount of from 0.6 to 11.2 g/m$^2$. It is desired that the tin plate has been treated with chromic acid or chromic acid/phosphoric acid such that the amount of chromium is from 1 to 30 mg/m$^2$ reckoned as metal chromium. A further example is an aluminum-coated steel plate plated with aluminum or clad with aluminum with pressure.

The thickness of the metal plate may vary depending upon the kind of the metal and use or size of the container but is, generally, from 0.05 to 3 mm and, particularly, from 0.1 to 2 mm. It is desired that the light metal plate has a thickness of from 0.1 to 2 mm and the surface-treated steel plate has a thickness of from 0.1 to 0.5 mm.

The container is not limited to the one shown in FIG. 2 but may be a monoblock (seamless) can of steel, a two-piece can of aluminum or steel, a three-piece welded can made of a tin plate, a chromium-plated steel plate or a nickel-plated steel plate, and an inner tube of a double-structured container. Furthermore, the closure of the aerosol container may be a mounting cup of aluminum or steel, a spectacle closure and a bottom closure. The number of parts of the aerosol container usually stands for the number of parts excluding the mounting cup. The two-piece and three-piece cans referred to in this specification therefore comply with this rule. The above-mentioned can barrels and closures can be formed by any known means. For example, the monoblock can is obtained by the impact forming, drawing-ironing, or the like working. The aerosol container is not limited to the one that uses a valve-holding mounting cup but may be the one in which the valve is directly fastened to the mouth of the can barrel.

The inner surface-coated metal container of the present invention can be widely applied even to the ordinary two-piece cans which are wrap-seamed with a widely known easy-open closure or top closure and to the ordinary three-piece cans which are wrap-seamed with a top closure and a bottom closure.

The coating may be applied to the formed can barrel or to the closure, or may be applied to a metal blank of before being formed. The coating material of the present invention exhibits excellent workability and makes it possible to obtain excellent adhesiveness and resistance against the corrosion even when it is applied to the metal blank of before being formed. In the monoblock cans and the like cans, the coating material may be applied to the can barrel that is formed.

The coating usually has a thickness of from 4 to 30 μm and, particularly, from 5 to 15 μm. When the thickness of the coating is smaller than the above-mentioned range, the coverage is not sufficient for the metallic base material. When the thickness of the coating is larger than the above-mentioned range, on the other hand, the workability tends to be deteriorated.

The coating material is applied to the metallic base material by a known coating method, such as roll coating, spray coating, electrostatic coating or doctor blade coating. The coating operation may be continuously executed as a coil coating or may be intermittently effected for the sheet. In the case of the monoblock can, the coating material is applied to the inner surface of the formed can barrel by spray coating or electrostatic coating.

The thermosetting polyamideimide coating material is fired after it has been applied. It is desired that the firing is effected at a temperature of, usually, from 180° to 320° C. and, particularly, from 190° to 300° C. for a period of from about 1 to 15 minutes, so that the absorbancy ratio R becomes not smaller than 2.5 and, particularly, not smaller than 3.0. The absorbency ratio R increases with an increase in the firing temperature. The absorbency ratio R also increases with an increase in the firing time. EXAMPLES The invention will now be described more concretely by way of the following Examples.

(Example 1)

48 Parts of a trimellitic anhydride, 52 parts of a 4,4'-diphenyl diisocyanate and 5 parts of a triethylenediamine were reacted in an N-methyl-2-pyrrolidone at 160° C. for 5 hours in order to obtain a polyamideimide resin. 85 Parts of this polyamideimide resin and 15 parts of a bisphenol A-type epoxy resin having an epoxy equivalent of 185 were dissolved in a mixture solvent consisting of N-methyl-2-pyrrolidone, xylene, MEK (methyl ethyl ketone) and cyclohexanone, such that the solid content was 30%, thereby to prepare a thermosetting polyamideimide coating material.

The inside of an impact-formed aluminum straight can which has been washed was spray-coated with the above-mentioned coating material such that the thickness of the coating was 12 μm, which was then fired at 250° C. for 8 minutes. Then, the coating material was applied to the outer surface of the thus coated straight can which was then subjected to the necking, curling and bottom working to obtain an aluminum impact-formed can for aerosol.

Separately, furthermore, the above-mentioned coating material was applied onto the aluminum plate such that the thickness was 5 μm by the roll-coating and was fired at 200° C. for 10 minutes. Then, an ordinary varnish was applied onto the opposite surface of the coated plate, and a mounting cup was so formed that the surface coated with the above-mentioned coating material was on the inner side. The coating material same as the one that was roll-coated was applied to the inner surface of the mounting cup by spray-coating such that the thickness was 5 μm, and was fired at 250° C. for 8 minutes. Thereafter, the stem and the housing were incorporated to fabricate a valve.

The inner coating of the aerosol can and the valve possessed an imide group/amide group absorbancy ratio of 5.1 as calculated from an IR spectrum, and the coating at the worked portion was in a favorable condition without being cracked. The coating exhibited no change and was in a favorable condition even after a hair dye was contained in the can and was preserved. Described below are the methods of evaluation.

Visually observed state of the coating at the worked portion.
Evaluation

⊚: good

○: peeled very little

Δ: peeled a little

X: peeled to an intermediate degree

XX: peeled to a large degree

Evaluation of the Content

The cans were filled with a hair dye, a hair liquid, a hair tonic, a sauce, etc., and were left to stand at 45° C. for three months. Thereafter, the cans were cut open to observe the state of the inner surfaces.
Evaluation ⊚: good ○: blistered, corroded, peeled and colored very little Δ: blistered, corroded, peeled and colored to a small degree X: blistered, corroded, peeled and colored to an intermediate degree XX: blistered, corroded, peeled and colored to a large degree (Example 2)

An aerosol can and a valve were obtained in the same manner as in Example 1 with the exception of using 70 parts of the amideimide resin and 30 parts of the epoxy resin.

(Example 3)

An aerosol can and a valve were obtained in the same manner as in Example 1 with the exception of using 95 parts of the amideimide resin and 5 parts of the epoxy resin, and effecting the firing at 220° C. for 10 minutes.

(Example 4)

An aerosol can and a valve were obtained in the same manner as in Example 1 with the exception of using 47 parts of the trimellitic anhydride and 53 parts of the 4,4'-diphenyl diisocyanate, selecting the ratio of the polyamideimide resin to the epoxy resin to be 90 to 10, and effecting the firing at 230° C. for 10 minutes.

(Example 5)

An aerosol can and a valve were obtained in the same manner as in Example 1 with the exception of using an epoxy resin having an epoxy equivalent of 475.

(Example 6)

An aerosol can and a valve were obtained in the same manner as in Example 1 with the exception of using 35 parts of the trimellitic anhydride, 14 parts of the pyromellitic anhydride and 51 parts of the 4,4'-diphenyl diisocyanate, and effecting the firing at 230° C. for 10 minutes.

(Example 7)

An aerosol can and a valve were obtained in the same manner as in Example 1 with the exception of using 47 parts of the trimellitic anhydride and 53 parts of a 4,4'-diphenylmethane diisocyanate as the diisocyanate.

(Example 8)

An aerosol can and a valve were obtained in the same manner as in Example 1 with the exception of reacting 65 parts of the trimellitic anhydride with 35 parts of a methaphenyldiamine in a dimethylacetamide at 130° C. for 30 minutes to synthesize a polyamide acid, followed by heating to obtain a polyamideimide resin.

Table 1 shows the results of evaluation of the aerosol cans and valves obtained in Examples 1 to 8.

(Comparative Example 1)

An aerosol can and a valve were obtained in the same manner as in Example 1 with the exception of preparing a coating material using a polyamideimide resin alone without being blended with the epoxy resin.

(Comparative Example 2)

An aerosol can and a valve were obtained in the same manner as in Example 1 with the exception of using 95 parts of the polyamideimide resin and 5 parts of the epoxy resin, and effecting the firing at 200° C. for 10 minutes.

(Comparative Example 3)

An aerosol can and a valve were obtained in the same manner as in Example 1 with the exception of using 97 parts of the polyamideimide resin and 3 parts of the epoxy resin.

(Comparative Example 4)

An aerosol can and a valve were obtained in the same manner as in Example 1 with the exception of using 45 parts of the polyamideimide resin and 55 parts of the epoxy resin, and effecting the firing at 160° C. for 10 minutes.

(Comparative Example 5)

An aerosol can and a valve were obtained in the same manner as in Example 1 with the exception of using an epoxy resin having an epoxy equivalent of 3300.

(Comparative Example 6)

An aerosol can and a valve were obtained in the same manner as in Example 1 with the exception of using an existing aqueous coating material.

(Comparative Example 7)

An aerosol can and a valve were obtained in the same manner as in Example 1 with the exception of using an existing epoxyphenol coating material.

Table 1 shows the results of evaluation of the aerosol cans and valves obtained in Comparative Examples 1 to 7.

(Example 9)

The coating material prepared in Example 1 was applied by spray-coating onto the inside of a deep-draw-formed aluminum DI straight can that has been washed such that the thickness was 12 μm, and was fired at 250° C. for 8 minutes. Then, the coating material was applied to the outer surface of the thus coated straight can which was then subjected to the necking and curling to obtain an aluminum DI can for aerosol. The can was filled with a hair liquid and a hair tonic to evaluate the resistance against the content.

(Example 10)

An aerosol can was obtained in the same manner as in Example 9 with the exception of using the coating material prepared in Example 3 and effecting the firing at 230° C. for 10 minutes.

(Example 11)

A polyamideimide resin was obtained by reacting 53 parts of a trimellitic anhydride with 47 parts of a 4,4'-diphenyl diisocyanate in an N-methyl-2-pyrrolidone at 130° C. for 8 hours. The coating material was prepared in the same manner as in Example 5 but using the above-mentioned polyamideimide resin.

An aerosol can was obtained in the same manner as in Example 9 but using the above-mentioned coating material and effecting the firing at 230° C. for 10 minutes.

(Example 12)

The coating material was prepared in the same manner as in Example 1 with the exception of using 10 parts of the epoxy resin, 10 parts of the phenolic resin and 80 parts of the polyamide resin.

An aerosol can was obtained in the same manner as in Example 9 with the exception of using the above-mentioned coating material and effecting the firing at 230° C. for 10 minutes.

Table 2 shows the results of evaluation of the aerosol cans obtained in Examples 9 to 12.

(Comparative Example 8)

An aluminum DI can was obtained in the same manner as in Example 9 with the exception of using the coating material prepared in Comparative Example 1.

(Comparative Example 9)

An aluminum DI can was obtained in the same manner as in Example 9 with the exception of using the coating material prepared in Comparative Example 5.

(Comparative Example 10)

An aluminum DI can was prepared in the same manner as in Example 9 with the exception of using the coating material prepared in Comparative Example 7.

Table 2 shows the results of evaluation of the aerosol cans obtained in Comparative Examples 8 to 10.

(Example 13)

The coating material prepared in Example 1 was applied by roll-coating onto a large LTS plate such that the thickness was 8 μm, and was fired at 215° C. for 10 minutes. After the outer surface was printed, the plate was cut into a predetermined blank and was joined by seam-welding to form a cylinder. After the welded portion was corrected, the cylinder was formed into a square shape to prepare an 18-liter can barrel.

Separately, furthermore, top and bottom closures were prepared by applying the same coating material followed by firing. The can barrel was wrap-seamed with the bottom closure. The can was then filled with a sauce, wrap-seamed with the top closure, sterilized with the hot water and was preserved in order to evaluate the resistance against the corrosion. Similarly, furthermore, the container was evaluated for its resistance against a synthetic detergent.

(Example 14)

By using the coating material prepared in Example 3, an 18-liter can was obtained in the same manner as in Example 13.

(Example 15)

By using the coating material prepared in Example 11, an 18-liter can was obtained in the same manner as in Example 13.

(Example 16)

By using the coating material prepared in Example 12, an 18-liter can was obtained in the same manner as in Example 13.

Table 3 shows the results of evaluation of the 18-liter cans obtained in Examples 13 to 16.

(Comparative Example 11)

By using the coating material prepared in Comparative Example 1, an 18-liter can was obtained in the same manner as in Example 13.

(Comparative Example 12)

By using the coating material prepared in Comparative Example 4, an 18-liter can was obtained in the same manner as in Example 13.

(Comparative Example 13)

By using the coating material prepared in

Comparative Example 6, an 18-liter can was obtained in the same manner as in Example 13.

Table 3 shows the results of evaluation of the 18-liter cans obtained in Comparative Examples 11 to 13.

According to the present invention, a thermosetting polyamideimide coating material and, particularly, a composition of a carboxyl group-containing polyamideimide resin and a curing agent consisting chiefly of an epoxy resin, is applied to the inner surface of a metallic aerosol container, and the absorbance ratio R of imide group/amide group is set to be not smaller than 2.5, in order to provide an inner surface-coated metal container and, particularly, an aerosol container exhibiting excellent inertness to the content and excellent resistance against the corrosion.

TABLE 1

Results of evaluation of Examples 1 to 8 and Comparative Examples 1 to 7
(impact-formed aluminum cans and valves)

| | Polyamideimide resin | | | Epoxy resin | | Imide group/ | Coating at worked portions | | Resistance to the content: hair dye | |
|---|---|---|---|---|---|---|---|---|---|---|
| | Composition | | Blended amount | Epoxy | Blended amount | amide group absorbancy | | | | |
| | Acid | Diisocyanate | (parts) | equivalent | (parts) | ratio | can | valve | can | valve |
| Example 1 | trimellitic anhydride | diphenyl diisocyanate | 85 | 185 | 15 | 4.9 | ⊚ | ⊚ | ⊚ | ⊚ |
| Example 2 | trimellitic anhydride | diphenyl diisocyanate | 70 | 185 | 30 | 5.3 | ⊚ | ⊚ | ⊚ | ⊚ |
| Example 3 | trimellitic anhydride | diphenyl diisocyanate | 95 | 185 | 5 | 2.5 | ○ | ○ | Δ | Δ |
| Example 4 | trimellitic anhydride | diphenyl diisocyanate | 90 | 185 | 10 | 3.0 | ⊚ | ⊚ | ○ | ○-Δ |
| Example 5 | trimellitic anhydride | diphenyl diisocyanate | 85 | 475 | 15 | 4.3 | ⊚ | ⊚ | ⊚ | ⊚ |
| Example 6 | trimellitic anhydride pyromellitic anhydride | diphenyl diisocyanate | 85 | 185 | 15 | 9.2 | ⊚ | ⊚ | ⊚ | ⊚ |
| Example 7 | trimellitic anhydride | diphenylmethane diisocyanate | 85 | 185 | 15 | 3.5 | ⊚ | ⊚ | ⊚ | ⊚ |
| Example 8 | trimellitic anhydride | methaphenyl-diamine | 85 | 185 | 15 | 4.0 | ⊚ | ⊚ | ⊚ | ⊚ |
| Comparative Example 1 | trimellitic anhydride | diphenyl diisocyanate | 100 | — | 0 | 1.5 | XX | XX | XX | XX |
| Comparative Example 2 | trimellitic anhydride | diphenyl diisocyanate | 95 | 185 | 5 | 2.4 | X | X-XX | X-XX | X-XX |
| Comparative Example 3 | trimellitic anhydride | diphenyl diisocyanate | 97 | 185 | 3 | 2.3 | Δ-X | Δ-X | X-XX | X-XX |
| Comparative Example 4 | trimellitic anhydride | diphenyl diisocyanate | 45 | 185 | 55 | 2.4 | XX | XX | XX | XX |

TABLE 1-continued

Results of evaluation of Examples 1 to 8 and Comparative Examples 1 to 7
(impact-formed aluminum cans and valves)

| | Polyamideimide resin | | | Epoxy resin | | Imide group/ | Coating | | Resistance to | |
| | Composition | | Blended amount | Epoxy | Blended amount | amide group absorbancy | at worked portions | | the content: hair dye | |
| | Acid | Diisocyanate | (parts) | equivalent | (parts) | ratio | can | valve | can | valve |
|---|---|---|---|---|---|---|---|---|---|---|
| Comparative Example 5 | trimellitic anhydride | diphenyl diisocyanate | 85 | 3300 | 15 | 2.2 | ○ | Δ | XX | XX |
| Comparative Example 6 | aqueous coating material | | | | | — | ○ | ○ | XX | XX |
| Comparative Example 7 | epoxy-phenol coating material | | | | | — | ○ | Δ | XX | XX |

TABLE 2

Results of evaluation of Examples 9 to 12 and Comparative Examples 8 to 10
(aluminum DI cans)

| | Polyamideimide resin | | | Epoxy resin | | Imide group/ | Coating | Resistance to the content | |
| | Composition | | Blended amount | Epoxy | Blended amount | amide group absorbancy | at worked | Hair | Hair |
| | Acid | Diisocyanate | (parts) | equivalent | (parts) | ratio | portions | liquid | tonic |
|---|---|---|---|---|---|---|---|---|---|
| Example 9 | Example 1 | | | | | 4.9 | ◎ | ◎ | ◎ |
| Example 10 | Example 3 | | | | | 2.5 | ○ | ◎ | ◎ |
| Example 11 | trimellitic anhydride | diphenyl diisocyanate | 85 | 475 | 15 | 2.5 | ◎ | ○ | ◎ |
| Example 12 | trimellitic anhydride | diphenyl diisocyanate | 80 | epoxy eq. 185, phenol | 10 pts. 10 pts. | 3.5 | ◎ | ○ | ◎ |
| Comparative Example 8 | Comparative Example 1 | | | | | 1.5 | X | XX | XX |
| Comparative Example 9 | Comparative Example 5 | | | | | 2.2 | Δ | X | Δ |
| Comparative Example 10 | Comparative Example 7 | | | | | — | Δ | X | Δ |

TABLE 3

Results of evaluation of Examples 13 to 16 and Comparative Examples 11 to 13
(18-liter cans)

| | Polyamideimide resin | | | Epoxy resin | | Imide group/ | Coating | Resistance to the content | |
| | Composition | | Blended amount | Epoxy | Blended amount | amide group absorbancy | at worked | | Synthetic |
| | Acid | Diisocyanate | (parts) | equivalent | (parts) | ratio | portions | Souce | detergent |
|---|---|---|---|---|---|---|---|---|---|
| Example 13 | Example 1 | | | | | 4.6 | ◎ | ◎ | ◎ |
| Example 14 | Example 3 | | | | | 2.5 | ◎ | ◎ | ◎ |
| Example 15 | Example 10 | | | | | 2.5 | ◎ | ◎ | ◎ |
| Example 16 | Example 11 | | | | | 3.4 | ◎ | ◎ | ◎ |
| Comparative Example 11 | Comparative Example 1 | | | | | 1.5 | X | XX | XX |
| Comparative Example 12 | Comparative Example 4 | | | | | 2.1 | Δ | Δ | X |
| Comparative Example 13 | Comparative Example 6 | | | | | — | ○ | Δ | Δ |

We claim:

1. An inner surface-coated metal container made of a metal having a cured polyamideimide coating and exhibiting excellent resistance against the contents, wherein said coating has an absorbancy ratio as defined by the following formula (I), $$R = I_{1720}/I_{1650} \quad (I)$$

wherein $I_{1720}$ denotes an absorbency of infrared characteristic absorption of an imide group at a wave number of about 1720 cm$^{-1}$, and $I_{1650}$ denotes an absorbancy of infrared characteristic absorption of an amide group at a wave number of about 1650 cm$^{-1}$, of not smaller than 2.5.

2. An inner surface-coated metal container according to claim 1, wherein said absorbancy ratio R is not larger than 10.

3. A container according to claim 1 or 2, wherein said cured polyamideimide coating is formed of a composition of a polyamideimide resin and a curing agent comprising an epoxy resin.

4. A container according to claim 3, wherein said composition contains the polyamideimide resin and the curing agent comprising the epoxy resin at a weight ratio of from 60:40 to 95:5.

5. A container according to claim 3, wherein said epoxy resin is a bisphenol-type epoxy resin having an epoxy equivalent of from 180 to 3300 and a number average molecular weight of from 360 to 4000.

6. A container according to claim 3, wherein said polyamideimide resin is the one derived from at least trifunctional or higher-functional aromatic polycarboxylic acid or an anhydride thereof and an aromatic compound having a bifunctional amino group or isocyanate group.

7. A container according to claim 4, wherein said epoxy resin is a bisphenol-type epoxy resin having an epoxy equivalent of from 180 to 3300 and a number average molecular weight of from 360 to 4000.

8. A container according to claim 4, wherein said polyamideimide resin is one derived from at least a trifunctional or higher-functional aromatic polycarboxylic acid or an anhydride thereof and an aromatic compound having a bifunctional amino group or isocyanate group.

9. A container according to claim 5, wherein said polyamideimide resin is one derived from at least a trifunctional or higher-functional aromatic polycarboxylic acid or an anhydride thereof and an aromatic compound having a bifunctional amino group or isocyanate group.

* * * * *